Dec. 2, 1924.
O. H. WAGER
ANGLE COCK FOR AIR BRAKE EQUIPMENT
Filed Aug. 9, 1922
1,517,325
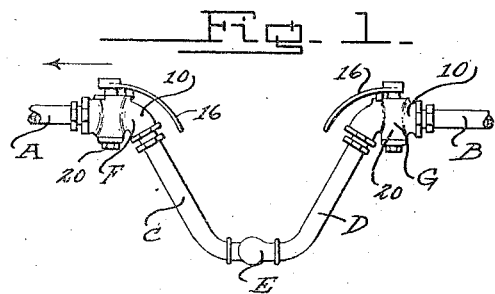
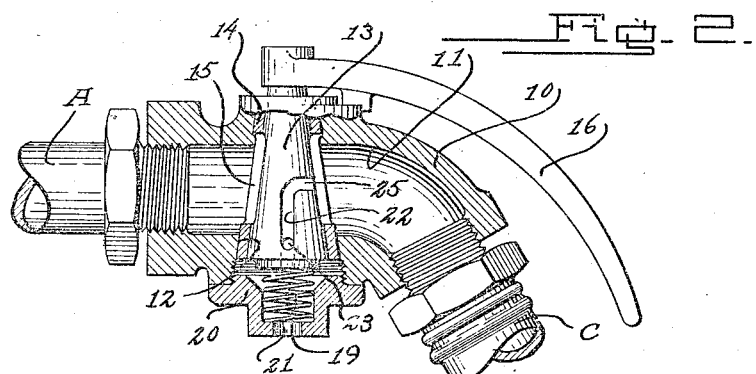
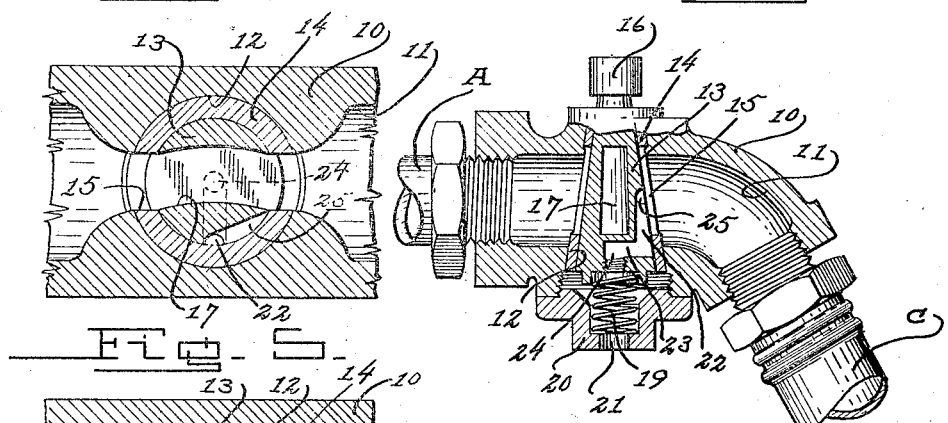
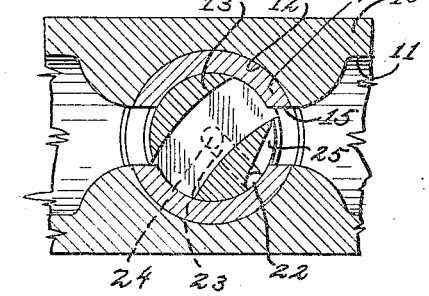
Inventor
Owen H. Wager
By Lancaster Allwine
Attorneys Patented Dec. 2, 1924.

1,517,325

UNITED STATES PATENT OFFICE.

OWEN H. WAGER, OF CINCINNATI, OHIO.

ANGLE COCK FOR AIR-BRAKE EQUIPMENT.

Application filed August 9, 1922. Serial No. 580,718.

*To all whom it may concern:*

Be it known that I, OWEN H. WAGER, a citizen of the United States, residing at Cincinnati, in the county of Hamilton and State of Ohio, have invented certain new and useful Improvements in Angle Cocks for Air-Brake Equipment, of which the following is a specification.

This invention relates to valves of the type utilized on air brake systems, and commonly known as angle cocks, and the primary object of the present invention is to provide an improved angle cock having an auxiliary way formed therein, so arranged as to effectively bleed the train pipe when the cock has been accidentally or inadvertently closed through any cause, and preventing the controlling of the air brake system by the engineer, said auxiliary way permitting the setting of the brakes automatically and thus preventing accidents from the accidental closing of the valve.

Another object of the invention is to provide an improved angle cock, which when moved to its closed position for permitting the uncoupling of air brake hoses, will effectively bleed the train pipe hose, and thus prevent the too forcibly uncoupling of the hoses, and the consequent injury to the washers thereof.

A further object of the invention is to provide an improved angle cock embodying a casing, a valve in the casing having the usual ways formed therein, and an auxiliary way opening out of the side face of the valve and through the lower end thereof, the casing having a cap nut provided with an exit port, which is adapted to permit the escape of air from the cock when the valve is turned to its closed position and the auxiliary way is in alignment with the way in the valve casing.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary side elevation of an air brake system showing the improved angle cocks incorporated therewith, the arrow indicating the engine end of the system.

Figure 2 is an enlarged vertical longitudinal section through one of the improved cocks.

Figure 3 is a similar view showing the valve turned to its closed position and illustrating the arrangement of the auxiliary way therein in order to effect the bleeding of the pipe.

Figure 4 is a fragmentary horizontal longitudinal section through the improved angle cock showing the valve in its open position.

Figure 5 is a similar view showing the valve in its partly closed position.

Referring to the drawings in detail, wherein similar reference characters designate corresponding parts throughout the several views, the letters A and B indicate a pair of train pipes forming a part of an air brake system; C and D, the hose therefor; E, the coupling for connecting the hose; and F and G, the novel angle cocks.

The train pipes A and B, the hose C and D, and the coupling E are all of the ordinary construction, and form a part of the usual air brake system.

The angle cocks F and G are of the same construction, and a description of one is deemed sufficient for both. As shown the improved angle cock includes the body 10 which has connected respectively to its opposite ends one of the train pipes and one of the connecting hose. The body 10 is provided with the longitudinally extending way or port 11, and intermediate its ends is provided with the tapered valve seat 12 for the reception of the tapered plug valve 13. If so desired, a suitable wear or bearing member 14 can be interposed between the valve seat 12 and the plug valve 13, and this bearing or wear member is provided with the diametrically opposite ports 15, which are in alignment with the longitudinally extending way 11 formed in the body 10.

The upper tapered end of the valve 13 protrudes in the ordinary manner through the upper end of the body 10, and this portion of the valve is so shaped as to receive the ordinary operating handle or crank 16. The plug valve 13 is provided with a diametrically extending way 17 which is adapted to be brought into alignment with the ports 15, formed in the bearing member 14, and with the longitudinal way 11 formed in the body 10. It can be seen, of course, that this way 17 can be turned at right angles as to the longitudinal way 11, in order to shut off the flow of fluid through the body and the train pipe. The valve 13 is normally held in frictionally tight engagement with the wear member 14 by means of an expansion spring 19, which is carried by the cap nut 20, which is threadably connected with the lower end of the body 10 in the ordinary manner. This cap nut 20 is provided with an axial way 21 for a purpose which will be hereinafter described.

The plug valve 13 is provided with a vertically disposed passageway or groove 22, formed in its outer face, which is arranged at right angles to the port 17 formed in the valve, and this way 22 communicates with an inwardly extending or radial way 23, which in turn communicates with an axial way 24, which opens out through the lower end of the valve at the axial center thereof, as clearly shown in Figure 3 of the drawings. The upper end of the way 22 terminates substantially at the transverse center of the valve 13, and communicates with an arcuate port or groove 25, which extends toward the port 17 but terminates short thereof.

In operation of the improved valve, it can be seen that when the valve 13 is turned from its open position shown in Figures 2 and 4 to a partially closed position as shown in Figure 5, or a completely closed position as shown in Figure 3 the port 17 is out of alignment with the longitudinally extending way 11, and the arcuate way or groove 25 will be brought into communication with the longitudinally extending passageway 11, which will permit the air to flow through the arcuate groove or port 25, through the groove or way 22, throughout the horizontal or radial way 23, through the axial way 24, into the cap nut 20, and through the axial way 21 into the atmosphere. The formation of the arcuate way or port 25 is such, that when the valve is turned almost to its closed position as shown in Figure 5 or to such a position where effective operation of the system by the engineer is prevented, that the same will be moved in communication with the longitudinal way 11 and permit the bleeding of the train pipe.

The ways are so formed that the same can be moulded in the plug valve 13 at the time of manufacture thereof.

I claim:

An angle cock for air brake systems comprising a valve body having a longitudinally extending air passage and having a transversely extending passage, a hollow conical bearing member mounted in the transversely extending passage and having opposed openings registering with the longitudinally extending air passage, a tapered valve plug fitting into the conical member and having a diametrically extending passage intermediate its ends movable into and out of registry with the openings of the conical member when said plug is rotated, said plug being provided with a longitudinally extending recess leading from one end and axially of the plug and at its inner end communicating with a radially extending passage opening through the side of the plug and communicating with a groove extending longitudinally of the plug toward the other end thereof and communicating with a groove extending circumferentially of the plug and terminating adjacent one end of the air passage extending diametrically through the plug, a cap nut for the valve body having a passage forming an outlet for air passing through the end of the plug, spring means between the cap nut and serving to hold the plug tightly wedged in the conical member, and means for turning the plug to move the diametrically extending passage thereof into and out of registering with the side ports of the conical member.

OWEN H. WAGER.